Feb. 12, 1929.
T. A. FLANDERS
TRANSMISSION
Filed May 27, 1927
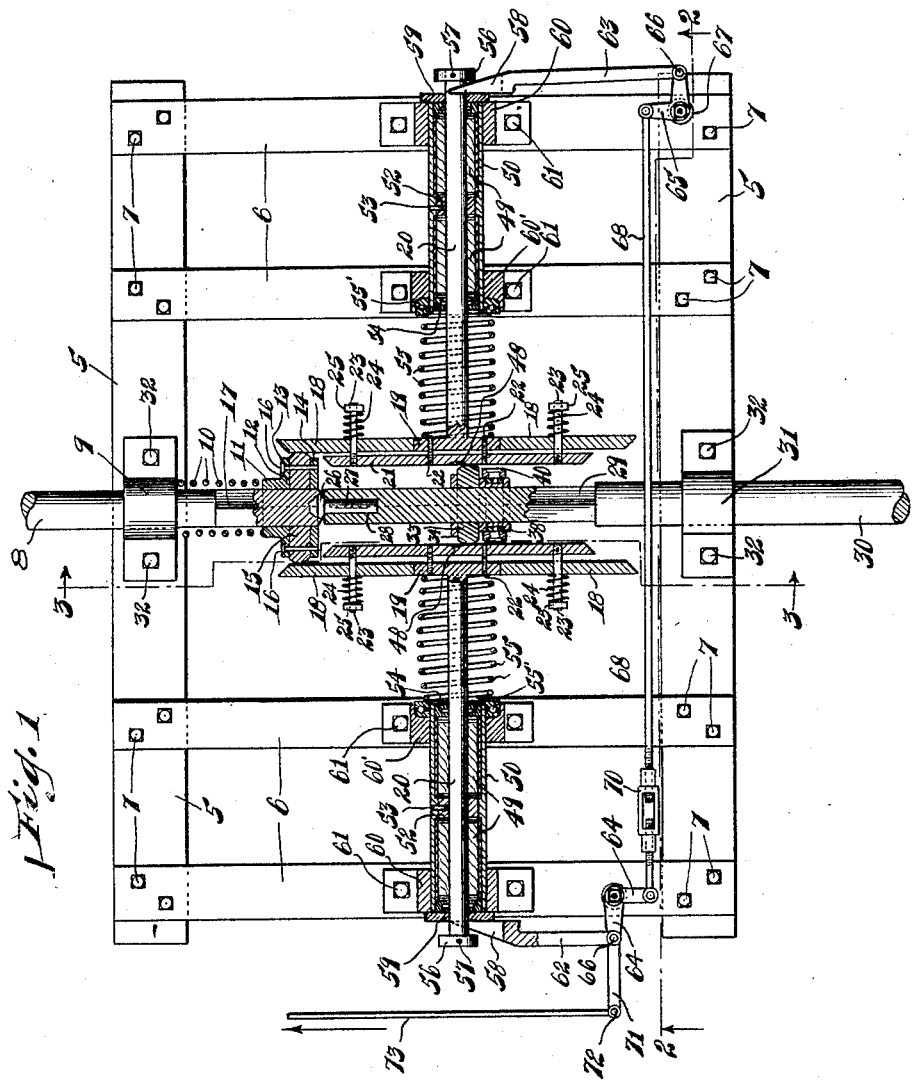
Inventor:
Thomas Alfred Flanders,
Witnesses:

Feb. 12, 1929.
T. A. FLANDERS
1,702,044
TRANSMISSION
Filed May 27, 1927   2 Sheets-Sheet 2
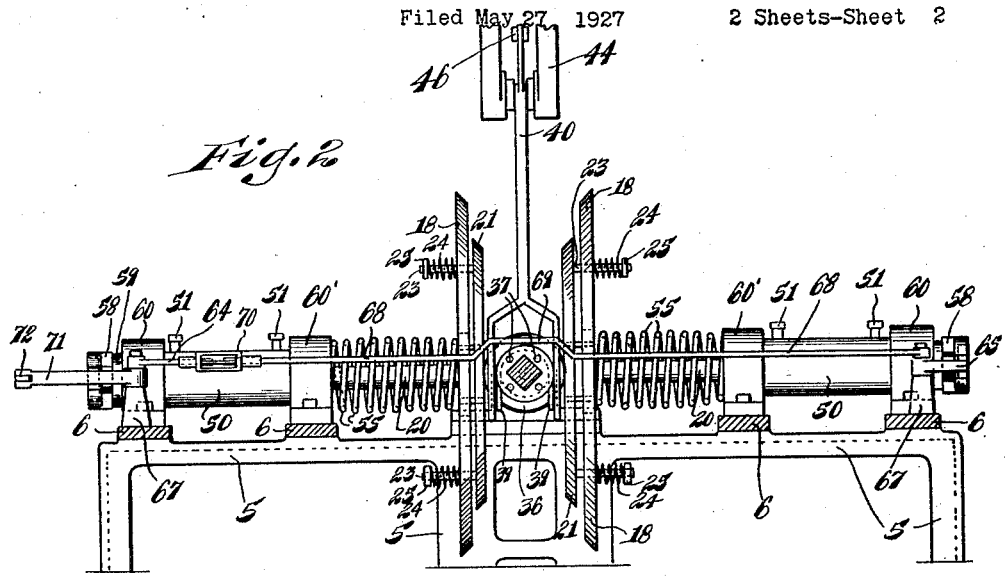
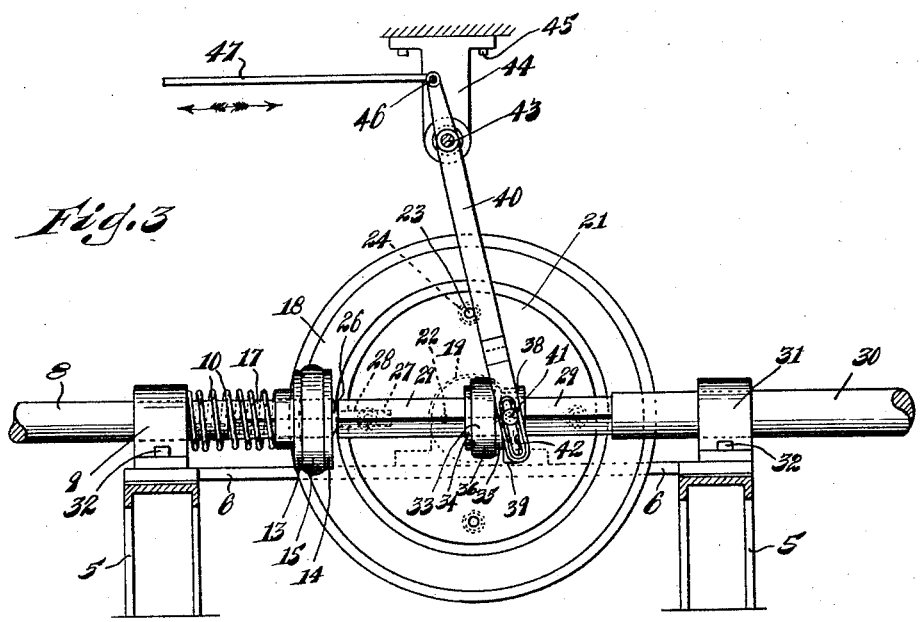

Patented Feb. 12, 1929.

1,702,044

UNITED STATES PATENT OFFICE.

THOMAS ALFRED FLANDERS, OF CHICAGO, ILLINOIS.

TRANSMISSION.

Application filed May 27, 1927. Serial No. 194,707.

My invention relates to a transmission and more particularly to a transmission for a motor vehicle and the like.

An object of my invention is to provide a transmission which is adapted to give any desired speed to the car from a standstill to an exceedingly high speed without the necessity of shifting gears or releasing the clutch, and which gives a gradual, smooth and constant increase in speed to the maximum speed desired.

Another object of my invention is to provide a transmission of the above indicated character which is composed of friction discs suitably arranged and mounted as to produce a simple and efficient transmission, which is not likely to require repair or replacement of parts for long periods of time.

Another object of my invention is to provide a transmission as above indicated, which is of light construction, efficient in operation, and which may be constructed at a minimum cost.

My invention will best be understood by reference to the accompanying drawings forming a part of this specification and in which:

Figure 1 is a top view partly in cross-section of a transmission incorporating my invention.

Figure 2 is a cross-sectional view taken on approximately the line 2—2 of Figure 1 and, Figure 3 is a cross-sectional view taken on approximately the line 3—3 of Figure 1.

In the drawings and for the purpose of illustration I have shown the preferred embodiment of my invention and in which numeral 5 designates a suitable frame member on which cross members 6 may be secured, by bolts or set screws 7, thus forming a suitable frame work on which I mount my improved transmission. Numeral 8 designates the main drive shaft which may be attached to the automobile engine or other source of motive power. The shaft 8 passes through and is rotatably mounted in a bearing 9 and is surrounded by a coil spring 10, which contacts against the inner end of the bearing 9 and a shoulder 11 of a friction pinion 12, which is composed of two steel flanges or side members 13 and 14, and a central friction portion 15 made of rubber or other suitable friction material. The several parts of said pinion 12 are secured rigidly together by means of bolts or set screws 16, and the pinion is slidably mounted on a squared section 17 of the shaft 8, but is secured from rotation relative thereto.

Pinion 12 as shown in Figure 1 is in engagement with two similar discs 18 and is adapted to rotate the same in opposite directions when the shaft 8 is rotated. Each disc 18 is loosely mounted on a flange 19 which is integral with the shaft 20; said flange 19 is rigidly secured to a disc 21 by suitable threaded bolts or pins 22. Near the outer edge of the disc 21 are pins 23 threaded on one end and securely screwed into the disc 21 and passing through disc 18 so that disc 18 is secured against rotation relative to disc 21, but is adapted to yield away from disc 21 by compressing the springs 24, which are mounted on the pins 23 and held in contact with disc 18 by nuts 25 on the outer end of pins 23.

Near the end of shaft 18 is a beveled portion 26 and a small cylindrical portion 27 extending therefrom and fitting into a cylindrical opening 28 in the squared portion 29 of shaft 30 and adapted for rotatory motion relative thereto. Shaft 30 is the power transmitting means by which power is transmitted to the drive wheels of the car and it is rotatably mounted in a bearing 31. Bearings 9 and 31 are secured to the frame pieces 5 by bolts 32 in any suitable manner. On the squared portion 29 of shaft 30 is slidably mounted a friction wheel 33 which is normally in contact with discs 21 and adapted to be rotated by said discs, and it in turn rotates the shaft 30. Wheel 33 is composed of two steel side members 34 and 35 with a friction member 36 of rubber or other suitable material, clamped therebetween by bolts or set screws 37 in the same manner that pinion 12 is constructed.

In the side member 35 of wheel 33, is provided a groove 38 in which is mounted a U-shaped collar 39 adapted to slide in said groove when the wheel is rotated, and is loosely secured to a shift lever 40, by set screws 41 attached to said collar, and adapted to slide in the slot 42 in the fork end of the shift lever 40. Near the upper end of said shift lever it is pivotally mounted on a cross shaft 43, secured in suitable depending members 44, which are suitably secured to some part of the car by bolts 45. The extreme upper end of the shift lever 40 is pivotally secured at 46 to a shift rod 47 which extends to the control compartment and is adapted to be manually operated for changing the position of friction wheel 33 on discs 21, for varying the speed of, or reversing the movement of the car as may be desired.

When the wheel 33 is shifted to the center point of disc 21 it is freed from contact with both discs by means of a cup shaped depression or neutral point 48 provided for that purpose.

The counter shafts 20 are mounted in the usual type of roller bearings 49 provided in the housings 50 which have grease cups 51 for supplying grease to the bearings. The housings are held in place by retaining or thrusting rings 52, which are themselves held in the housings 50 by set screws 53. Near the outer end of housings 50 are other washers 54 snugly pressed into the ends of the housings and have felt washers therein to prevent the grease from coming out of the housings. Each shaft 20 is adapted to reciprocate in its bearings and is resiliently held inwardly by coil springs 55 interposed between flanges 19 and a thrust bearing 55' fitted, and the inward movement is limited by a collar 56 secured to the outer end of shaft 20 by a set screw 57; said collar contacts a wedge shaped forked member 58 adapted to be forced in between the collar 56 and a thrust washer 59 abutting the outer end of a supporting member 60, and thereby withdrawing shaft 20 and disc 21 from contact with friction wheel 33, and disconnecting the drive shaft pinion from engagement with disc 18. Discs 18 and 21 are made of steel plates or other suitably rigid material.

Each housing 50 is tightly pressed into suitable openings in the supporting members 60 and 60' which are secured to cross members 6 by suitable set screws 61. The forked members 58 are adapted to be operated by shanks 62 and 63 pivotally secured at 66 to bell crank levers 64 and 65 respectively; said levers are pivotally mounted on standards 67 to allow freedom of operation, and they are connected together by a cross-bar 68, bent upward at 69 and provided with a turn buckle 70, which is adapted to provide adjustment in the effective length of the cross-bar.

The bell crank lever 64 has an extension 71 to which is pivotally secured, at 72, a pull rod 73 which extends to the control compartment and may be secured to a clutch pedal and adapted to be manually operated.

In operation the drive shaft 8 rotates pinion 12 which in turn rotates discs 18 in opposite direction, said discs are rotatably secured to discs 21 and rotate them also. Discs 21 being in engagement with friction wheel 33 causes it to rotate in one direction or the other depending on which side of the neutral point 49 the friction wheel may be shifted by the shift rod 47.

Wheel 33 is adapted to be shifted along the squared section of shaft 30 and when it reaches the inner end of said shaft the wheel is in contact with discs 21 adjacent the outer edges and the shafts 8 and 30 have at this time attained equal speeds in the same direction. When this condition has resulted the wheel 33 may be shifted partly off the end of shaft 30 and a short distance on to the end of shaft 8, sufficiently to force pinion 12 out of contact with discs 18, wheel 33 out of contact with discs 21, and at the same time secure shafts 8 and 30 together so that they must rotate as a unit, then discs 18 and 21 and shafts 20 come to rest.

At any time when the friction wheel 33 is being driven by discs 21 the power transmission to shaft 30 may be disconnected simply by manually moving clutch 73 in the direction indicated by the arrow, thereby forcing wedge members 58 in between thrust washers 59 and collars 57 on the end of shafts 20, and thereby withdrawing the shafts and the discs 18 and 21 with them, from engagement with wheel 33. When the friction wheel 33 is shifted to a position opposite the neutral points 48 in the center of discs 21 it becomes disengaged with discs 21 and power will not be transmitted to shaft 30 even though the discs are being rotated by pinion 12.

While I have described my invention in its preferred form it will be understood that many variations may be made therein without departing from the spirit of the invention. I do not, therefore, wish to be limited to the precise details as described, but desire to avail myself of such variations and modifications as come within the scope of the appended claims.

I claim as my invention:

1. In combination, a drive shaft and a driven shaft in alignment; a pair of shafts at right angles to said aligned shafts; said right angle shafts being provided with flanges; springs urging against said flanges; a friction pinion carried by the drive shaft and a friction wheel carried by the driven shaft; disks carried by said flanges and having driving connection therewith; secondary disks surrounding said flanges and yieldingly held against the first disks; said secondary disks adapted to engage said friction pinion, and the first disks adapted to engage said friction wheel.

2. In combination, a drive shaft and a driven shaft; a friction pinion adapted to rotate with and be reciprocated along the drive shaft; a friction wheel adapted to rotate with the driven shaft and adapted to be shifted along the same; a driven disk and a driving disk; said friction pinion adapted to engage the face of said driven disk, which is resiliently secured to said driving disk;

said driving disk adapted to engage said friction wheel on the driven shaft, for driving said driven shaft; a spring yieldingly resisting longitudinal movement of said pinion; means for shifting said friction wheel into engagement with said friction pinion, for forcing it along the drive shaft, and against the resistance of said spring, and out of engagement with said driven disk, permitting it to cease rotation; said friction wheel adapted to enter upon the end of the drive shaft, while in engagement with said friction pinion, for coupling the drive shaft and the driven shaft together.

3. In combination, a drive shaft and a driven shaft; a friction pinion adapted to rotate with and be reciprocated along the drive shaft; a friction wheel adapted to rotate with the driven shaft and adapted to be shifted along the same; a driven disk and a driving disk; said friction pinion adapted to engage the face of said driven disk, which is resiliently secured to said driving disk; said driving disk adapted to engage said friction wheel on the driven shaft, for driving said driven shaft; a spring yieldingly resisting longitudinal movement of said pinion; means for shifting said friction wheel into engagement with said friction pinion, for forcing it along the drive shaft, and against the resistance of said spring, and out of engagement with said driven disk, permitting it to cease rotation; said friction wheel adapted to enter upon the end of the drive shaft, while in engagement with said friction pinion, for coupling the drive shaft and the driven shaft together; means for resiliently holding said driving disk in engagement with said friction wheel for imparting motion to the driven shaft, and means for withdrawing said disk from engagement with said friction wheel.

4. In combination, a drive shaft and a driven shaft; a friction pinion adapted to rotate with and be reciprocated along the drive shaft; a friction wheel adapted to rotate with the driven shaft and adapted to be shifted along the same; a driven disk and a driving disk; said friction pinion adapted to engage the face of said driven disk, which is resiliently secured to said driving disk; said driving disk adapted to engage said friction wheel on the driven shaft, for driving said driven shaft; a spring yieldingly resisting longitudinal movement of said pinion; means for shifting said friction wheel into engagement with said friction pinion, for forcing it along the drive shaft, and against the resistance of said spring, and out of engagement with said driven disk, permitting it to cease rotation; said friction wheel adapted to enter upon the end of the drive shaft, while in engagement with said friction pinion, for coupling the drive shaft and the driven shaft together; means for resiliently holding said driving disk in engagement with said friction wheel for imparting motion to the driven shaft, and means for withdrawing said disk from engagement with said friction wheel; said means consisting of a counter shaft to which said disk is secured, and a wedge member adapted to force said countershaft outwardly.

5. In combination, a drive shaft and a driven shaft; a friction pinion adapted to rotate with and be reciprocated along the drive shaft; a friction wheel adapted to rotate with the driven shaft and adapted to be shifted along the same; a driven disk and a driving disk; said friction pinion adapted to engage the face of said driven disk, which is resiliently secured to said driving disk; said driving disk adapted to engage said friction wheel on the driven shaft, for driving said driven shaft; a spring yieldingly resisting longitudinal movement of said pinion; means for shifting said friction wheel into engagement with said friction pinion, for forcing it along the drive shaft, and against the resistance of said spring, and out of engagement with said driven disk, permitting it to cease rotation; said friction wheel adapted to enter upon the end of the drive shaft, while in engagement with said friction pinion, for coupling the drive shaft and the driven shaft together; means for resiliently holding said driving disk in engagement with said friction wheel for imparting motion to the driven shaft, and means for withdrawing said disk from engagement with said friction wheel; said means consisting of a counter shaft to which said disk is secured, and a wedge member adapted to force said countershaft outwardly; said driving disk having a depression constituting a neutral point, at which point the driving disk is retained from engagement with said friction wheel, thereby allowing said driven shaft to stop rotation while the drive shaft and the disks continue to rotate.

6. A power transmitting means, consisting of a drive shaft and a driven shaft in alignment; a friction pinion slidably mounted on the drive shaft and adapted to rotate therewith; friction disks adapted to contact with said friction pinion; said pinion adapted to transmit power to said friction disks; counter shafts at right angles to said aligned shafts; bearings for said counter shafts; a flange on each of said counter shafts; springs urging against said flanges; each of said disks being loosely mounted on said flanges; means for reciprocating each counter shaft endwise in its bearings for withdrawing said disk from contact with said pinion; a second disk yieldingly secured to each of said first disks, and having driving connection with said flanges, and means for transmitting power from said second disks to said driven shaft.

7. A power transmitting means, consisting of a drive shaft and a driven shaft in alignment; a friction pinion slidably mounted on the drive shaft and adapted to rotate therewith; friction disks adapted to contact with said friction pinion; said pinion adapted to transmit power to said friction disks; counter shafts at right angles to said aligned shafts; bearings for said counter shafts; a flange on each of said counter shafts; springs urging against said flanges; each of said disks being loosely mounted on said flanges; means for reciprocating each counter shaft endwise in its bearings for withdrawing said disk from contact with said pinion; a second disk yieldingly secured to each of said first disks, and having driving connection with said flanges, and means for transmitting power from said second disks to said driven shaft; said means consisting of a friction wheel slidably mounted on said driven shaft and adapted to rotate therewith.

8. A power transmitting means, consisting of a drive shaft and a driven shaft in alignment; a friction pinion slidably mounted on the drive shaft and adapted to rotate therewith; friction disks adapted to contact with said friction pinion; said pinion adapted to transmit power to said friction disks; counter shafts at right angles to said aligned shafts; bearings for said counter shafts; a flange on each of said counter shafts; springs urging against said flanges; each of said disks being loosely mounted on said flanges; means for reciprocating each counter shaft endwise in its bearings for withdrawing said disk from contact with said pinion; a second disk yieldingly secured to each of said first disks and having driving connection with said flanges, and means for transmitting power from said second disks to said driven shaft; said means consisting of a friction wheel slidably mounted on said driven shaft and adapted to rotate therewith; means for shifting said friction wheel along the faces of said second disks and along said driven shaft for changing the speed of rotation thereof.

In testimony whereof I have signed my name to this specification.

THOMAS ALFRED FLANDERS.